Sept. 1, 1970  L. O. BENTZ ET AL  3,526,306

CLUTCH FACING

Filed Feb. 8, 1968

INVENTORS.
LLOYD O. BENTZ
HAROLD C. HILTON

BY Howson & Howson

ATTYS

United States Patent Office 3,526,306
Patented Sept. 1, 1970

3,526,306
CLUTCH FACING
Lloyd Oscar Bentz, Lancaster, and Harold Clifford Hilton, Manheim, Pa., assignors to Raybestos-Manhattan, Inc., Manheim, Pa., a corporation of New Jersey
Filed Feb. 8, 1968, Ser. No. 704,035
Int. Cl. F16d *13/60, 65/02*
U.S. Cl. 192—107                                                 7 Claims

ABSTRACT OF THE DISCLOSURE

A clutch facing formed of a compressed spiral coil of fabric of V-shaped cross section with the projecting portions of the fabric nesting within recessed portions of adjacent convolutions, the fabric being impregnated with a heat-hardening cement containing an elastomer, the clutch facing being reinforced by a spiral coil of an assembly of substantially parallel continuous glass filaments in which the individual convolutions lie between adjacent convolutions of the fabric at the apex of the recessed portions thereof, the glass fibers having a surface capable of forming a strong bond with an elastomer, and the assembly of glass fibers being impregnated with an elastomer which is vulcanizably compatible with the elastomer in the fabric cement.

---

It has heretofore been proposed to strengthen clutch facings formed of a strip of material wound in spiral fashion against disruption by centrifugal force by bonding to one face a coextensive metal sheet or fibrous backing layer of felted or woven material. A particular disadvantage of such use of metal sheet is high inertia, requiring greater power to rotate the clutch assembly. Other disadvantages of a metal reinforcing sheet are the difficulty of obtaining a substantially flat sheet which will meet clutch assembly dimensional tolerances, and increased costs. Although clutch facings reinforced by a fibrous backing layer, as disclosed for example in U.S. Pat. No. 2,640,795, are relatively inexpensive to produce, and have increased bursting strength, nevertheless, the increase in bursting strength provided by the backing layer may not be sufficient to cope with the very high rotative speeds clutch facings are subjected to in today's motor vehicles.

It is an object of this invention to provide novel reinforced clutch facings of the above-described type which can be produced relatively inexpensively, yet have substantially increased bursting strength.

Figure 1:
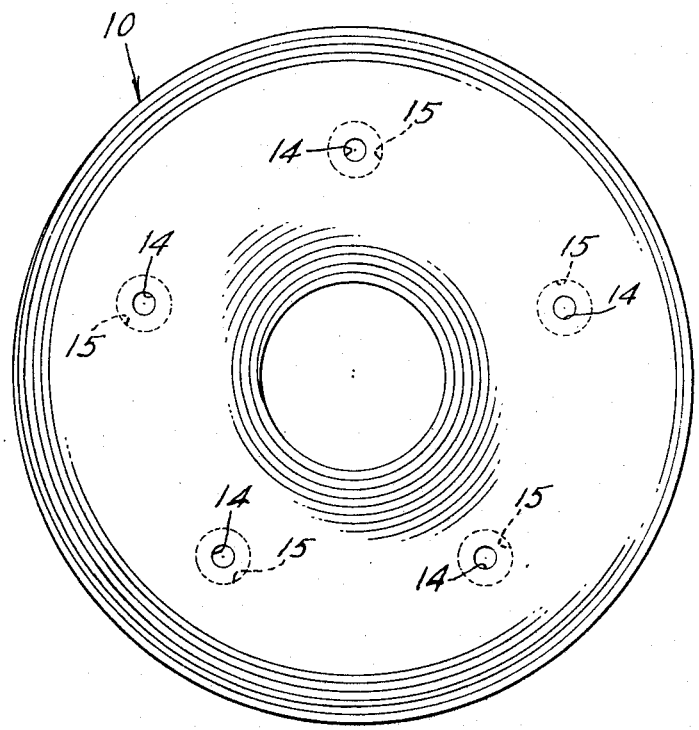
FIG. 1 is a plan view of a reinforced clutch facing, in accordance with the present invention.
Figure 2:
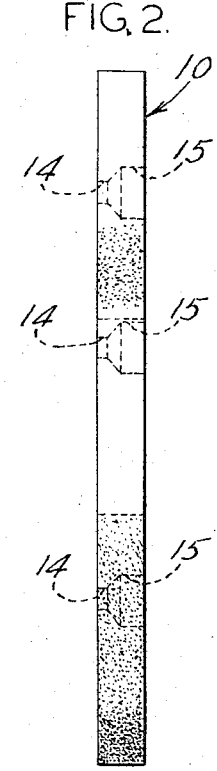
FIG. 2 is an end elevation of a clutch facing of this invention.

Referring to the drawings, the reference numeral 10 indicates a clutch facing according to this invention which comprises a coiled strip 11 comprising a woven fabric having metallic wires 12 associated with at least some of the strands thereof. The several convolutions of the fabric strip 11 are bonded together by a cement composition comprising heat-hardenable resin, vulcanizable elastomer and friction material filler with which the strip is impregnated.

Figure 3:
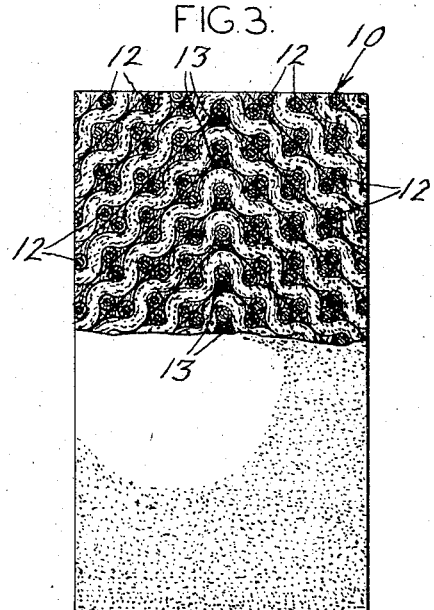
FIG. 3 is a fragmentary enlarged end elevation of the clutch facing of FIG. 2 with a part broken away to show the construction.

In FIG. 3 the fabric strip is shown folded longitudinally into chevron form in cross section, with the adjacent convolutions in interesting relationship as described in Cilley U.S. Pat. No. 2,096,692. Although not shown, it will be understood that the fabric strip may be longitudinally shaped to provide other deformed cross sections, such as, for example a W-shape, or an arcuate shape.

Extending longitudinally of fabric strip 11 are a plurality of ends 13 of glass yarn. These yarn ends preferably lie in a plane extending perpendicular to the axis of the clutch facing equidistant from the edges of the fabric. As shown in FIG. 3, preferably the glass yarn ends lie in the recessed portion of the fabric at about the apex of the chevron.

Figure 5:
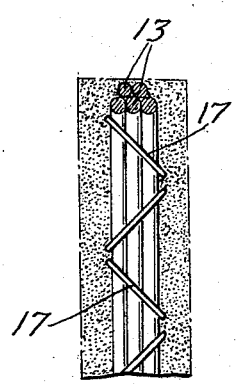
FIG. 5 is an enlarged detail of a portion of the tape shown in FIG. 4 with reinforcing glass yarn ends extending longitudinally of the tape and retained in place by chain stitches.

In order to maintain the yarn ends in place during fabrication of the clutch facing, they may be sewn to the fabric strip by a chain or other suitable stitch as shown in FIG. 5.

The glass yarn employed in the clutch facings of this invention is described more fully hereinafter.

The clutch facings are provided with rivet holes 14 having counterbores 15, for example by drilling, for reception of attaching rivets for securing the facings to a suitable clutch plate, not shown.

In preparing the fabric 11, the yarns can be made of asbestos fibers alone or mixtures with other fibers such as cotton, wool, rayon, linen or jute. In weaving the fabric 11, reinforcing threads or strands of any of the above fibrous materials may be used.

Figure 4:
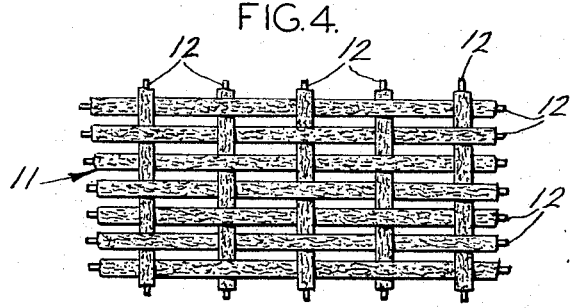
FIG. 4 is an enlarged detail of a form of woven asbestos fabric which may be employed in the clutch facings of this invention.

Preferably the yarns are of asbestos fibers, or mixtures of asbestos fibers and other fibers such as cotton fibers and are reinforced with fine metal wires of brass, copper, zinc, lead, or other metal. This form of woven fabric is illustrated in FIG. 4 where the fabric 11 comprises asbestos warp threads and asbestos weft threads reinforced with brass wires 12.

An example of a particularly useful fabric is one formed of warp and weft yarns comprising a mixture of about 75% by weight of spinning grade asbestos fibers and 25% by weight of organic fibers, such as cotton fibers, reinforced with brass wire approximately 0.008" in diameter.

The woven fabric sheet is impregnated with a cement composition comprising heat-hardenable resin, vulcanizable elastomer and friction material filler.

The heat-hardenable or thermosetting resin may be of the phenolic type, such as a phenol aldehyde, and especially a phenol formaldehyde resin, which, if desired, may have been rendered oil-soluble by reaction with linseed or cashew nut oil.

The vulcanizable elastomer of the cement may be natural rubber or a synthetic elastomer such as neoprene, polychloroprene, butadiene-styrene, butadiene-acrylonitrile, isoprene, the more recently developed hydrocarbon elastomers such as those comprising a copolymer of ethylene, propylene and a third monomer, such as dicyclopentadiene, which provides unsaturation for curing, and the like, and especially those elastomeric materials which are curable or vulcanizable by reaction to a set stage by peroxide or through sulfur linkages. The elastomer-containing cement, of course, will also include well known vulcanizing and stabilizing agents.

The cement composition preferably contains a conventional friction material filler. Such fillers ordinarily will comprise inorganic materials such as litharge and barytes, or an organic filler, such as particles formed of polymerized cashew nut oil.

Typical cement compositions particularly suitable for impregnating the fabric 11 of the clutch facings of this invention are as follows, the proportions given being in parts by weight:

| | |
|---|---|
| Vulcanizable elastomer | 5–15 |
| Accelerator | .05–.5 |
| Sulfur | 1–12 |
| Barytes | 30–50 |
| Litharge | 10–40 |
| Graphite | 0.5–10 |
| Thermosetting resin | 5–25 |

Preferably, the cement composition will contain from about 25% to about 75% vulcanizable elastomer solids and from about 75% to about 25% of heat-hardenable resin solids, based on the combined weight of the two.

The woven fabric 11 may be impregnated with cement by passing the fabric through a solution of the cement in a hydrocarbon solvent and removing the excess by any suitable means, such as squeeze rolls. The fabric is then heated to a temperature at which the solvent evaporates but below that required for curing the resin and elastomer.

Rather than forming the clutch facing from a single type of fabric, it may be formed of a spirally wound multi-ply strip having two or more plies of different type fabric. A suitable plied construction which may be used in forming the clutch facings of this invention is disclosed in the copending application of Robert W. Stormfeltz, Ser. No. 499,328, filed Oct. 21, 1965. According to that application, an annular body is formed of a spirally wound multi-ply strip having at least one ply comprising a woven fabric having metallic wires associated with at least some of the strands thereof, and one or more plies of thin, flexible, consolidated and condensed, dry carded spinning grade asbestos web material of relatively high porosity, the fibers being interlocked with each other. Preferably, the asbestos fiber web material is reinforced by an open mesh woven glass fabric.

The substantially improved burst strength of the clutch facings of the present invention is obtained by reason of their novel construction employing a particular type of a reinforcing assembly of glass fibers.

As used in this specification and claims, a "filament" of glass is meant to define a substantially continuous individual fiber of glass. A "strand" on the other hand, is a collection or assembly of a great number of substantially parallel individual filaments. Thus, a strand may include from 100 up to 2000 individual filaments gathered together in a manner well-known in the art and technology of glass fiber manufacture. A "yarn" is made up of a plurality of strands, e.g., ranging from 2 to 30 and even up to 50 strands, plied or assembled together continuously. Both the strands and yarn may possess a twist, reverse twist, or no twist at all.

As stated above, an assembly of continuous glass filaments, which may be in the form of one or more strands of yarn ends, is combined with the fabric 11, or a composite fabric formed of a plurality of layers of the same or different fabric. The assembly of glass filaments will extend longitudinally of the fabric (or composite fabric) so that when the fabric is spirally wound to form an annular clutch facing, the individual convolutions of the assembly of glass fibers lie between adjacent convolutions of the fabric as shown particularly in FIG. 3. In addition, the assembly of glass filaments should lie in recessed portions of the fabric. As shown in FIG. 3, the yarn ends 13 lie in the recessed portions of the fabric 11 at approximately the apex of the chevron.

The individual filaments used in forming the strands and yarn preferably have a diameter of from about $20 \times 10^{-5}$ to about $75 \times 10^{-5}$ inch. Preferably, the filaments are approximately $35 \times 10^{-5}$ to $40 \times 10^{-5}$ inch in diameter. Also preferably the individual filaments have the properties listed in Table I below:

TABLE I

Tensile strength (min.)—500,000 p.s.i.
Tenacity (min.)—15.3 g.p.d.
Ultimate elongation (max.)—4.8%
Elastic recovery (min.)—100%
Toughness (min.)—11,900 p.s.i.
Modulus (min.)—10,500,000 p.s.i.
Coefficient of thermal expansion (max.)—$2.8 \times 10^{-6}$
Water absorbency (max.)—0.3%
Moisture regain (max.)—0.0%

Ordinarily the assembly of glass filaments will be in the form of one or more yarn ends, each composed of a plurality of strands. These yarn ends generally will vary in diameter from about 0.015 to about 0.025 inch, a particularly preferred size being approximately 0.020 inch. The number of yarn ends employed will depend upon the dimensions of the clutch facing. In order to obtain the necessary reinforcement, a greater number of yarn ends will be used with larger diameter facings than with smaller diameter facings. For example, a burst strength as high as 12,000 r.p.m. may be obtained by a clutch facing having an O.D. of approximately 7 inches and an I.D. slightly less than 5 inches, using a single end of glass yarn approximately $38 \times 10^{-5}$ inch in diameter. On the other hand, three or even four ends of the same glass yarn may be required to obtain a similarly high burst strength in a clutch facing having an O.D. approaching 13 inches and an I.D. of about 7 inches. Table II below shows the brust strength that can be obtained according to this invention for clutch facings of different dimensions using different numbers of ends of glass yarn.

In order that the glass filaments can effectively contribute reinforcing action to the clutch facing, it is desirable that the glass filaments be first treated to provide protection against interfilament destructive action and to provide the glass filaments with surfaces which are capable of forming a strong and permanent bond with a vulcanizable elastomeric material. This can be accomplished by one or more sprayed-on liquid "size" treatments just after the glass filament is formed, and a subsequent impregnation of the strands or yarns as they are formed, usually simply by introducing the gathered filaments into a part of the treating liquid while simultaneously distorting the strand filaments to effect penetration. A system of treatment for glass filaments may involve a first surface treatment embodying an anchoring agent which enhances the bonding relationship between the glass filament surface and the ultimately used elastomeric material, followed by impregnation with an elastomer.

A suitable anchoring agent is represented by the amino silanes such as gamma-aminopropyltriethoxy silane or by a similar silane having a carboxyl group in the organic group attached to the silicon atom or an amino or carboxyl group in the carboxylate group of a Werner complex compound. These may be applied to the glass filament surfaces or incorporated as a component of a size composition. The use of such silanes as anchoring agents is disclosed in U.S. Pat. No. 3,287,204 issued Nov. 22, 1966.

Another treatment to obtain enhanced bonding of an elastomer to glass filaments involves the application thereto of an aqueous solution of magnesium chloride, zinc chloride, or magnesium hydroxide or zinc hydroxide. After application is made in the form of the chloride, the solution in aqueous medium may be adjusted to an alkaline pH to effect deposition on the glass filaments in the form of the hydroxide. The hydroxides are then converted to the corresponding oxides by heat treatment. This method is described in U.S. Pat. No. 3,311,528 issued Mar. 28, 1967.

The glass filaments may also be rendered receptive to forming a strong bond with a vulcanizable elastomer by treating the glass filaments with a size having as an essential ingredient, the reaction product of an imidazoline having a long chain fatty acid group containing at least 5 carbon atoms and an unsaturated polyester resin formed in an uncured stage as disclosed in U.S. Pat. No. 3,097,963 issued July 16, 1963.

Other suitable procedures for rendering glass filaments receptive to forming a strong bond with a vulcanizable elastomer involve the use of a chromic (Werner) complex compound having a carboxylato group coordinated with a trivalent nuclear chromium atom in which the carboxylato group is of less than 6 carbon atoms and contains a highly functional group (U.S. Pat. No. 2,552,910), the use of a silane, its hydrolysis products or its polymerization products having at least one of the organic groups attached to the silicon atom containing less than 7 carbon atoms and having been formed with ethylenic unsaturation (U.S. Pat. No. 2,563,288), the use of a silane-organic polymeric compound having film forming properties (U.S. Pat. No. 3,169,884), and the use of a size consisting of an organo silicon compound in the form of a silane, a water dispersible polyvinyl pyrrolidine, gelatin, and a water dispersible polyester resin (U.S. Pat. No. 3,207,623).

This invention is not limited to any specific treatment of the glass filaments, provided the treatment provides the glass filament surfaces with the ability to form a strong bond with a vulcanizable elastomer.

After treatment of the glass filaments with an anchoring agent for an elastomer, such as one of those described hereinabove, preferably the bundle of glass filaments is impregnated with a vulcanizable elastomer which is vulcanizably compatible with the vulcanizable elastomer used to impregnate the fabric strip. For this purpose, the strand or yarn of glass filaments is simply unwound from a supply drum and advanced submergedly into a bath of the elastomeric impregnant. Thence, the impregnated yarn is pulled through a wiping die which works the impregnating liquid into the interior regions of the bundle or strand and also serves to wipe off excess material.

The glass fiber strands may be impregnated with the same vulcanizable elastomer as used in the fabric cement or a different one, provided the respective elastomers are vulcanizably compatible and bond together.

Ends of glass filament yarn, preferably impregnated with a vulcanizable elastomer, are attached to the strip of fabric by any suitable means so that the yarn ends extend longitudinally of the fabric. One suitable method of attaching the glass yarn ends to the cloth is by stitching the two together as illustrated in FIG. 5. The attaching threads 17, may be of any suitable material, such as cotton, nylon, etc. A particularly useful stitch is a chain stitch. Rather than stitching the glass yarn to the fabric, resort may be made to adhesives which are compatible with the fabric cement.

After the glass fiber yarn has been attached to the fabric, the fabric can be shaped or folded longitudinally to impart to it an arcuate, V-shape, or other deformed cross section with the glass fiber yarn ends lying in the longitudinally extending recess. This can be done prior to or simultaneously with forming the fabric strip into a spiral coil. Suitable apparatus for folding the fabric strip longitudinally while simultaneously winding the strip is disclosed in U.S. Pat. No. 2,096,692. Preferably the fabric is so folded that the glass fiber yarn ends lie in the deepest part of the recessed portion, as for example at the apex of the chevron.

After the fabric strip containing the fiberglass reinforcement has been wound spirally to form an annular body, the body is compressed and consolidated under heat and pressure. For example, the annular body can be subjected to a pressure of the order of 5000 p.s.i. at 320° F. for a period of a few minutes to effect densification and partial cure of the fabric cement. Subsequently the body can be heated at about 400° F. for a period of several hours to convert the thermosetting resin of the fabric cement to the substantially infusible insoluble state, and to vulcanize the elastomers in the cement and glass fibers.

Subsequently, the resulting clutch facing may be subjected to a finishing operation, as for example surface grinding to the desired dimensions. The rivet holes 12 may be formed during the molding operation or formed subsequently by drilling and counterboring.

The following specific examples are given to further describe the advantages of this invention.

The clutch facings produced according to the following examples were tested for burst strength using the following procedure. Burst strength data are recorded in Table II.

Each clutch facing was riveted to the driven member making certain the rivets were properly tightened. The mounted clutch facing was then heated for 15 minutes in a circulating air oven maintained at 500° F. The mounted clutch facing was removed from the oven and promptly (within 15 seconds) mounted on the shaft of a Centrifugal Burst Machine. The test was immediately begun and the driven member to which the test clutch facing was mounted reached 3500 r.p.m. in approximately 2 seconds. Thereafter the speed of rotation of the driven member was increased at an average rate of approximately 135 r.p.m./sec. until the clutch facing burst, at which time the speed of rotation was recorded.

EXAMPLE I

A woven cloth 40" wide comprising brass wires inserted in asbestos yarn and having a count of 14×5 was impregnated in a vertical tower with approximately 55 percent, by weight (solvent-free basis) of the following heat-curable cement composition which was dissolved in a hydrocarbon solvent:

| Constituent: | Parts by weight |
|---|---|
| Butadiene-styrene rubber | 9.0 |
| Phenol aldehyde resin | 17.0 |
| Litharge | 27.0 |
| Graphite | 2.0 |
| Barytes | 36.0 |
| Accelerator | 0.3 |
| Sulfur | 6.7 |
| Plasticizers | 2.0 |
| | 100.0 |

The dried impregnated cloth was cut into strips approximately 0.438 in. wide. A single end of a fiberglass yarn was placed longitudinally of each strip of cloth and stitched in place by a heavy duty sewing machine by means of a chain stitch using cotton thread. The strips were then folded longitudinally to from an inverted V-shaped cross section with the glass yarn lying in the recessed portion at the apex of the V. The fiberglass yarn, which was approximately 0.02" in diameter, comprised five strands which were twisted together, there being two and one half turns per inch. Each strand comprised approximately 400 continuous glass filaments, each having a diameter of approximately $38 \times 10^{-5}$ in. The surfaces of the filaments had been chemically treated to render them capable of forming a strong bond with rubber, and the strands were impregnated with a butadiene-styrene rubber.

The V-shaped strips of cloth having glass fiber yarn attached thereto were convolutely wound to form a number of annular clutch facings in which the several convolutions were in interesting relation as shown in FIG. 3.

The several clutch facings were placed in heated molds and subjected to a pressure of 5000 p.s.i. at 320° F. for 3 minutes and 30 seconds to effect densification and partial cure of the cement. Subsequently the clutch facings were further heated at 400° F. for 5 hours to convert the thermosetting phenolic resin to the infusible insoluble state and to vulcanize the elastomers.

The clutch facings were ground to the following dimensions: O.D. 7.060"; I.D. 4.92"; thickness 0.138".

The several clutch facings were tested for burst strength using the above-described procedure. The results are given in Table II, below.

EXAMPLE II

A number of clutch facings were prepared as described in Example I, with the exception that two ends, rather than a single end of glass yarn, were used. Burst strength data for these clutch facings are set forth in Table II, below.

EXAMPLE III

A number of clutch facings having an O.D. of 10", an I.D. of 6.5" and a thickness of 0.135" were prepared as described in Example I. Burst strength data for these clutch facings are set forth in Table II, below.

EXAMPLE IV

Clutch facings having an O.D. of 10", an I.D. of 6.5" and a thickness of 0.135" were prepared as described in Example I, with the exception that two ends, rather than a single end of glass yarn, were used. Burst strength data for these clutch facings are set forth in Table II, below.

EXAMPLE V

A number of clutch facings having an O.D. of 11.5", an I.D. of 7" and a thickness of 0.125" were prepared as described in Example I, with the exception that two ends, rather than one end, of glass yarn, were used. Burst strength for these clutch facings are set forth in Table II, below. Burst strength data on a clutch facing of similar construction but not reinforced with glass yarn, in this size, is included for comparison purposes and marked Example Va.

EXAMPLES VI TO XI

Clutch facings were prepared as described in Example I. The dimensions, number of ends of glass yarn used, and burst strength data for these clutch facings are set forth in Table II, below.

TABLE II

| Example | Dimensions (inches) | Number of ends of fiberglass yarn [1] | Burst strength (r.p.m.)[2] Minimum | Maximum |
|---|---|---|---|---|
| I | 7.060 x 4.921 x .138 | 1 | 12,050 | [3] 12,050 |
| II | 7.060 x 4.921 x .138 | 2 | 11,420 | 12,050 |
| III | 10 x 6.5 x .135 | 1 | 9,790 | 9,900 |
| IV | 10 x 6.5 x .135 | 2 | 10,780 | 11,420 |
| V | 11.5 x 7 x .125 | 2 | 10,010 | 10,780 |
| Va | 11.5 x 7 x .125 | 0 | 7,700 | 8,030 |
| VI | 10.4 x 6.5 x .135 | 1 | 10,120 | 10,670 |
| VII | 10.4 x 6.5 x .135 | 2 | 10,560 | 11,000 |
| VIII | 11 x 6.5 x .135 | 1 | 10,100 | 10,780 |
| IX | 11 x 6.5 x .135 | 2 | 10,670 | 11,000 |
| X | 12.85 x 7 x .133 | 3 | 10,780 | 11,000 |
| XI | 12.85 x 7 x .133 | 4 | 10,120 | 11,000 |

[1] Pittsburgh Plate Glass Co. electrical glass continuous filament yarn, formed of 5 strands each composed of glass fibers $38\times10^5$ inches in diameter. Yarn diameter 0.02".
[2] Average of 6 specimens.
[3] Burst after 60 minutes at 570° F.

It will be apparent from the foregoing that there is hereby provided a novel arrangement of fabric, glass fibers, and elastomeric material in the manufacture of clutch facings whereby the physical and mechanical properties of the molded product are greatly improved.

It will be understood that various changes may be made in the details of construction, arrangement and in the processing steps for the manufacture, without departing from the spirit of the invention, especially defined in the following claims.

What is claimed is:

1. A friction element in the form of an annular body comprising a spiral coil of fabric folded longitudinally to provide a symmetrical cross-sectional form having recessed and projecting portions on opposite sides, the projecting portions of said fabric nesting within the recessed portions of adjacent convolutions, said fabric being impregnated with a heat-curable cement composition comprising a thermosetting resin and a vulcanizable elastomer, a spiral coil of an assembly of substantially parallel continuous glass filaments, the individual convolutions of said assembly of glass filaments lying between adjacent convolutions of said fabric in the recessed portions thereof, the surfaces of said glass filaments having been treated with an anchoring agent for improving the bond between said surfaces of said glass filaments and a vulcanizable elastomeric material, and said assembly having been impregnated with a vulcanizable elastomer which is vulcanizably compatible with said vulcanizable elastomer in said fabric cement, said coil of fabric being compressed to consolidate the convolutions upon each other, and heat treated to cure said cement, whereby said thermosetting resin is converted to the infusible, insoluble state and said elastomers are vulcanized.

2. A friction element according to claim 1 in which said assembly of glass fibers comprises a plurality of ends of yarn formed of substantially continuous parallel glass filaments having a diameter from about $20\times10^{-5}$ to about $75\times10^{-5}$ inch.

3. A friction element according to claim 2 in which said yarn ends have a diameter of from about 0.015 to about 0.025 inch.

4. A friction element according to claim 3 in which said assembly of glass fibers is impregnated with a vulcanizable elastomer comprising butadiene and styrene.

5. A friction element according to claim 4 in which said fabric cement comprises an oil soluble phenol aldehyde resin and vulcanizable elastomer comprising butadiene and styrene.

6. A friction element according to claim 5 in which said fabric is a woven fabric comprising asbestos fibers having metallic wires associated with at least some of the strands thereof.

7. A friction element according to claim 6 in which said fabric is folded longitudinally in chevron form, and said ends of glass yarn lie in the recessed portion of said fabric at the apex of said chevron.

References Cited

UNITED STATES PATENTS

| | | | |
|---|---|---|---|
| 2,052,808 | 9/1936 | Spokes | 192—107 XR |
| 2,096,692 | 10/1937 | Cilley | 192—107 XR |
| 2,175,399 | 10/1939 | Judd | 192—107 XR |
| 2,428,298 | 9/1947 | Spoiles et al. | 188—251 XR |
| 2,546,056 | 3/1951 | Batchelor | 192—107 XR |
| 2,555,260 | 5/1951 | Walters | 192—107 XR |
| 2,640,795 | 6/1953 | Bertolet | 192—107 XR |
| 2,702,770 | 2/1955 | Steck | 192—107 XR |
| 3,068,131 | 12/1962 | Morton | 192—107 XR |
| 3,365,041 | 1/1968 | Stormfeltz | 192—107 XR |
| 3,287,204 | 11/1966 | Marzocchi | 161—175 |
| 3,429,766 | 2/1969 | Stormfeltz | 161—35 |

FOREIGN PATENTS 854,005  12/1938  France.

MARTIN P. SCHWADRON, Primary Examiner

L. J. PAYNE, Assistant Examiner

U.S. Cl. X.R.

161—175; 188—251, 259